United States Patent [19]

Kohtoh et al.

[11] Patent Number: 4,929,658
[45] Date of Patent: May 29, 1990

[54] COMPOSITION FOR LIQUID CRYSTAL ALIGNING AGENT

[75] Inventors: Noriaki Kohtoh; Yoshihiro Tsuruoka; Toyohiko Abe; Hiroyoshi Fukuro, all of Ichihara, Japan

[73] Assignee: Nissan Chemical Industries Ltd., Tokyo, Japan

[21] Appl. No.: 334,571

[22] Filed: Apr. 7, 1989

[30] Foreign Application Priority Data

Apr. 14, 1988 [JP] Japan .................................. 63-92601
Apr. 14, 1988 [JP] Japan .................................. 63-92602

[51] Int. Cl.$^5$ .............................................. C08K 5/20
[52] U.S. Cl. ...................................... 524/219; 430/20
[58] Field of Search ....................... 524/219; 525/435; 528/292; 430/20

[56] References Cited

FOREIGN PATENT DOCUMENTS 62-262829 11/1987 Japan .

Primary Examiner—Veronica P. Hoke
Attorney, Agent, or Firm—Oblon, Spivak, McClelland, Maier & Neustadt

[57] ABSTRACT

This invention is concerned with a composition to be used as an agent for aligning liquid crystals in a liquid crystal cell, wherein liquid crystal molecules are aligned with an increased pretilt angle with respect to the substrate, such composition consists essentially of a polyimide resin precursor having repeating units represented by the formula (I)

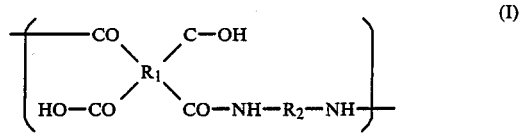

wherein $R_1$ denotes an organic group constituting a tetracarboxylic acid or its derivative; and $R_2$ represents a divalent organic group constituting a diamine; and a precursor of a diimide compound represented by the formula (II) or (III):

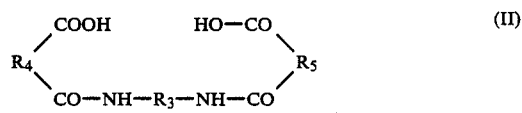

wherein $R_3$ denotes a divalent organic group constituting a diamine; each of $R_4$ and $R_5$ represents an organic groups constituting a dicarboxylic acid containing an alkyl group having 6 to 20 carbon atoms, or its derivative,

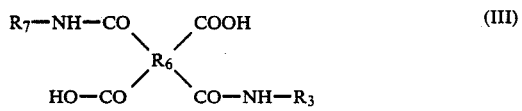

wherein $R_6$ denotes an organic group constituting a tetracarboxylic acid or its derivative, and each of $R_7$ and $R_8$ represents an organic group constituting a monoamine containing an alkyl group having 6 to 20 carbon atoms.

5 Claims, No Drawings

COMPOSITION FOR LIQUID CRYSTAL ALIGNING AGENT

The present invention relates to a composition for liquid crystal aligning agent. More particularly, it is concerned with a composition to be used as an agent for aligning liquid crystals in a liquid crystal cell, in which liquid crystal molecules are aligned with an increased pretilt angle with respect to the substrate, the composition having its excellent property of uniform applicability.

There has so far been used most commonly an organic resin film such as a polyimide resin film, etc. as a substrate treating agent for aligning the nematic liquid crystal molecules substantially in parallel with a transparent substrate such as glass or plastic film provided with transparent electrodes.

It has been known that, in this case, by rubbing the organic resin film formed on the substrate in a predetermined direction with a cloth, the liquid crystal molecules are aligned in the direction of rubbing, and, at the same time, liquid crystals are usually aligned with a pretilt angle of from 1° to 3° with respect to the substrate surface.

Also, as a method for aligning the liquid crystal molecules with a large pretilt angle, there has so far been adopted a method, in which an inorganic film such as a silicon oxide film or the like is formed on the substrate by vapor-deposition.

However, with the above-mentioned conventional method, in which the organic resin film formed on the substrate is rubbed, it is difficult to align the liquid crystal molecules with a large pretilt angle.

On the other hand, the method of vapor-deposition of the inorganic film on the substrate is complicated and cumbersome in comparison with the rubbing method, hence it is not necessarily a suitable method for the practical production on an industrial scale.

As the expedient for solving the above-mentioned points of problem, use of a composition consisting of a polyimide resin precursor and a monoamine having a long-chain alkyl group, as the liquid crystal aligning agent, has been proposed in, for example, Japanese Unexamined Patent Publication No. 262829/1987. According to this method, it has become possible to increase the pretilt angle for aligning the liquid crystals by the rubbing treatment. On the other hand, however, compatibility between the polyimide resin precursor and the long-chain-alkyl-group-containing monoamine to constitute the above-mentioned composition is not necessarily sufficient with the consequence that, when the composition is applied onto the substrate as the liquid crystal aligning agent, there is a possibility of the problem to arise on its uniform applicability, and the composition is not always satisfactory when its production on an industrial scale is taken into consideration.

The present inventors have made strenuous efforts in solving the above-mentioned problems, and as a result, they have accomplished the present invention.

According to the present invention, there is provided a composition for a liquid crystal aligning agent which consists essentially of:

a precursor of polyimide resin having repeating units represented by the following formula (I):

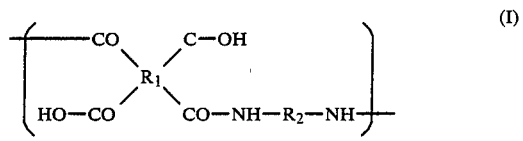

wherein $R_1$ denotes an organic group constituting a tetracarboxylic acid or its derivatives; and $R_2$ represents a divalent organic group constituting a diamine; and a precursor of a diimide compound represented by the following formula (II) or (III):

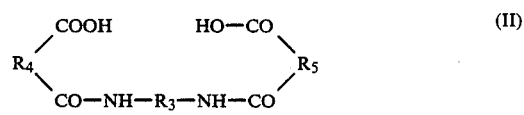

wherein $R_3$ denotes a divalent organic group constituting a diamine; each of $R_4$ and $R_5$ represents an organic group constituting dicarboxylic acid containing an alkyl group having from 6 to 20 carbon atoms, or its derivative, or

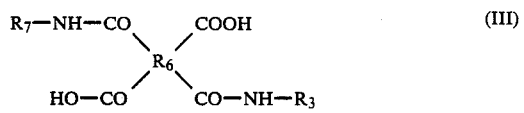

wherein $R_6$ denotes an organic group constituting a tetracarboxylic acid or its derivative; and each of $R_7$ and $R_8$ represents an organic group constituting a monoamine containing an alkyl group having 6 to 20 carbon atoms.

The composition according to the present invention can be used as a liquid crystal aligning agent by applying the same on a transparent substrate such as glass or plastic film provided with transparent electrodes, forming a polyimide resin film by curing the composition as applied, and finally rubbing the thus formed film of the polyimide resin The polyimide resin precursor represented by the formula (I) to be used for the composition according to the present invention is obtained by reacting one or more compounds selected from tetracarboxylic acids represented by the following formula (IV):

wherein $R_1$ denotes a tetravalent organic group constituting a tetracarboxylic acid, the four carbonyl groups attached to $R_1$ being bonded directly to individual carbon atoms, respectively, and their derivatives, with a diamine represented by the following formula (V):

wherein $R_2$ denotes a divalent organic group constituting a diamine.

There is no particular limitation to the reaction conditions, and any appropriate method for obtaining the polyimide resin precursor may be adopted in general.

For example, it has been a general practice to use tetracarboxylic dianhydride as the tetracarboxylic acid and its derivative represented by the formula (IV), which is reacted with a diamine represented by the formula (V) in the presence of a polar solvent such as dimethyl formamide, dimethyl acetamide, N-methyl pyrrolidone, and others. Further, the molar ratio of the tetracarboxylic acid dianhydride and the diamine to be reacted should be in a range of from 0.5 to 2, or preferably from 0.9 to 1.1. As is the case with the ordinary polycondensation reaction, as the molar ratio of these two components is closer to 1, the molecular weight of the resulting polyimide resin precursor becomes larger.

The reaction temperature for the production of the polyimide resin precursor ranges from $-20°$ to $150°$ C. or preferably from $-5°$ to $100°$ C.

Specific examples of the tetracarboxylic acids of the above formula (IV) include aromatic tetracarboxylic acids such as pyromellitic acid, benzophenone tetracarboxylic acid and 3,4,3',4'-biphenyl tetracarboxylic acid, and dianhydrides thereof as well as dicarboxylic acid di-acid halides thereof; alicyclic tetracarboxylic acids such as cyclobutane tetracarboxylic acid, cyclopentane tetracarboxylic acid and cyclohexane tetracarboxylic acid, and dianhydrides thereof as well as dicarboxylic acid di-acid halides thereof; and aliphatic tetracarboxylic acids such as butane tetracarboxylic acid, and dianhydrides thereof as well as dicarboxylic acid di-acid halides thereof.

These tetracarboxylic acids represented by the above formula (IV) and their derivatives may be used singly or in combination as a mixture of two or more different kinds.

Specific examples of the diamine represented by the above formula (V) include aromatic diamines such as p-phenylenediamine, m-phenylenediamine, diaminodiphenyl methane, diaminodiphenyl ether, 2,2-diaminodiphenyl propane, diaminodiphenyl sulfone, diaminobenzophenone, diaminonaphthalene, 1,3-bis(4-aminophenoxy)benzene, 1,4-bis(4-aminophenoxy)benzene, 4,4'-di(4-aminophenoxy) diphenylsulfone, 2,2'-bis[4-(4-aminophenoxy)phenyl]propane, 1,1,1,3,3,3-hexafluoro-2,2-bis[4-(4-aminophenoxy)phenyl]propane and 1,1,3,3,3-hexafluoro-2,2-bis[4-(4-aminophenoxy)phenyl]propane. Further, compounds of the following formulas may be exemplified.

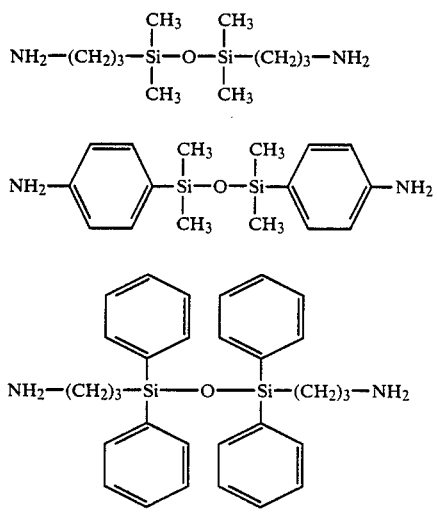

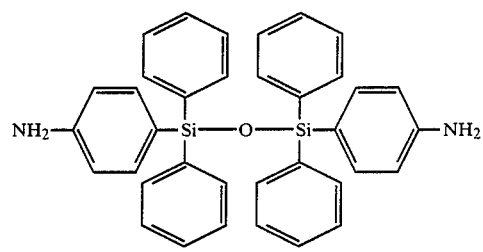

Besides these, alicyclic diamines and aliphatic diamines may also be used depending upon particular purposes. These diamines may be used singly or in combination as a mixture of two or more different kinds.

The precursor of a diimide compound represented by the above formula (II) for use as the composition according to the present invention may be obtained by reacting one or more compounds selected from diamines represented by the following formula (VI):

wherein $R_3$ denotes a divalent organic group constituting a diamine, with dicarboxylic acids represented by the following formulas (VII) and (VIII):

wherein each of $R_4$ and $R_5$ denotes an organic group constituting a dicarboxylic acid containing an alkyl group having from 6 to 20 carbon atoms, or its derivative or their derivatives.

There is no particular limitation to the reaction conditions for obtaining the diimide compound precursor represented by the above formula (II), and any appropriate method for obtaining the precursor of polyimide resin may be adopted.

As an example of the diamine represented by the formula (IV), there may be used the same diamine as represented by the formula (V). These diamines may be of the same kind or of mutually different kinds.

Further, it is a common practice to use dicarboxylic acid anhydrides, as the dicarboxylic acids represented by the formulas (VII) and (VIII), or their derivatives, which are reacted, in the presence of a polar solvent such as dimethyl formamide, dimethyl acetamide, N-methyl pyrrolidone, and so forth, with a diamine represented by the formula (VI) at a molar ratio of 1:1:1 among the dicarboxylic acid anhydrides of the general formulas (VII) and (VIII), and the diamine of the formula (VI).

The radical groups $R_4$ and $R_5$ in the dicarboxylic acids of the formulas (VII) and (VIII) or their derivatives may be of the same kind or of mutually different kinds.

Specific examples of the dicarboxylic acids include n-hexyl succinic acid, n-octyl succinic acid, n-dodecyl succinic acid, n-tetradecyl succinic acid, n-hexadecyl succinic acid, n-dodecyl glutaric acid, n-hexadecyl glutaric acid, n-octyl phthalic acid, n-dodecyl phthalic acid, n-hexadecyl phthalic acid, 3-hexadecyl oxyphthalic acid, 3-dodecyl oxycarbonyl phthalic acid, 3-tetradecyl oxycarbonyl phthalic acid, 3-hexadecyl oxycarbonyl phthalic acid, n-octyl hexahydrophthalic acid, n-dodecyl hexahydrophthalic acid, and their derivatives. It should be noted that these dicarboxylic acids are not limitative to the present invention. Further, these dicarboxylic acids or their derivatives may be used singly or in combination as a mixture of two or more different kinds.

When the carbon content in the alkyl group contained in these carboxylic acids or their derivatives is below 5, the effect of increasing the pretilt angle of the liquid crystal molecules is not sufficient. On the contrary, when the carbon content in this alkyl group exceeds 20, various disadvantages and inconveniences such as poor applicability of the composition to the substrate, and so on tend to appear readily.

The precursor of a diimide compound represented by the formula (III) to be used for the composition according to the present invention is obtained by reacting one or more compounds selected from tetracarboxylic acids represented by the following formula (IX):

wherein $R_6$ denotes a tetravalent organic group constituting a tetracarboxylic acid, the four carbonyl groups attached to $R_6$ being bonded directly to individual carbon atoms, respectively, and their derivatives, with monoamines represented by the following formulas (X) and (XI):

wherein each of $R_7$ and $R_8$ denotes an organic group constituting a monoamine containing an alkyl group having from 6 to 20 carbon atoms.

There is no particular limitation to the reaction conditions for obtaining the diimide compound precursor represented by the formula (III), and any appropriate method for obtaining the polyimide resin precursor may be adopted in general.

For example, it has been a general practice to use tetracarboxylic dianhydride, as the tetracarboxylic acid and its derivative represented by the formula (IX), which is reacted with monoamines represented by the formulas (X) and (XI) in the presence of a polar solvent such as dimethyl formamide, dimethyl acetamide, N-methyl pyrrolidone, and others, at a molar ratio of 1:1:1 among the tetracarboxylic acid anhydride of the formula (IX), and monoamines of the formulas (X) and (XI).

Specific examples of the tetracarboxylic acid of the formula (IX) and its derivatives may be the same as those compounds exemplified with regard to the formula (IV).

Also, as regards the monoamines represented by the formulas (X) and (XI), the radical groups $R_7$ and $R_8$ may be of the same kind or of different kinds.

Specific examples of the monoamines are aliphatic amines such as n-hexylamine, n-octylamine, n-decylamine, n-dodecylamine, n-hexadecylamine, 1,3-dimethylbutylamine, 1,5-dimethylhexylamine, 2-ethylhexylamine and so forth; and aromatic amines such as p-aminophenolhexane, p-aminophenyloctane, p-aminophenyldodecane, p-aminophenylhexadecane, p-aminophenoxyoctane, p-aminophenoxydodecane, p-aminophenoxyhexadecane, and so on. These monoamines may be used singly or in combination as a mixture of two or more different kinds.

When the carbon content in the alkyl groups $R_7$ and $R_8$ contained in the monoamines represented by the formula (III) is below 5, the effect of increasing the pretilt angle of the liquid crystal molecules is not sufficient. On the contrary, when the carbon content in these alkyl groups exceeds 20, various disadvantages and inconveniences such as poor applicability of the composition to the substrate, and so on tent to appear readily.

Solution of the diimide compound precursor of the formula (II) or (III) as produced may be used as it is, or it may be charged into an excessive amount of water or a weak solvent such as methanol to sediment the same for recovery.

In the preparation of the composition according to the present invention, the quantity of use of the diimide compound precursor represented by the formula (II) or (III) is usually in a range of from 0.1 to 100% by weight relative to the polyimide resin precursor of the formula (I). With the quantity of use of the diimide compound precursor represented by the formula (II) or (III) being under 0.1% by weight, no satisfactory effect can be recognized in some cases. Contrary to this, when the quantity exceeds 100% by weight, various disadvantages and inconveniences such as poor applicability of the composition to the substrate, and so on tend to appear readily.

The solvent to be used for preparing the composition according to the present invention may be any appropriate one, provided that it is capable of dissolving the polyimide resin precursor represented by the formula (I) and the diimide compound precursor represented by the formula (II) or (III).

Specific examples of these solvents are N,N-dimethylformamide, N,N-dimethylacetamide, N-methylpyrrolidone, N-methylcaprolactum, dimethylsulfoxide, tetramethylurea, pyridine, dimethylsulfone, hexamethylsulfoamide, butyltalatone, and others. These solvents may be used singly or in combination as a mixture of two or more different kinds.

Further, even with a solvent which is incapable of yielding a uniform solution of the composition, it is feasible to admix such solvent with the above-mentioned solvent within such a range, that yields the uniform solution.

The quantity of the solvent to be used may be within such a range that dissolves uniformly the polyimide resin precursor represented by the formula (I) and the diimide compound precursor represented by the formula (II) or (III). Usually, a quantity of from 0.5 to 100 parts by weight of the solvent is used relative to 1 part by weight of the total of the polyimide resin precursor represented by the formula (I) and the diimide compound precursor represented by the formula (II) or (III).

The composition according to the present invention may be prepared in accordance with any of the following various methods: (1) a method of simultaneously dissolving into the solvent the polyimide resin precursor of the formula (I) and the diimide compound precursor of the formula (II) or (III); (2) a method of first dissolving into the solvent the polyimide resin precursor of the formula (I), followed by addition for dissolution of the diimide compound precursor of the formula (II) or (III); (3) a method of first dissolving into the solvent the diimide compound precursor of the formula (II) or (III), followed by addition for dissolution of the polyimide resin precursor; (4) a method of dissolving individually and separately into a solvent the polyimide resin precursor of the formula (I) and the diimide compound precursor of the formula (II) or (III), followed by mixing the individual solutions; (5) a method of adding the diimide compound precursor of the formula (II) or (III) per se or its solution in a solvent to the polyimide resin precursor of the formula (I) after its production; and others.

The composition according to the present invention can be used as the liquid crystal cell aligning agent. For the production of such liquid crystal aligning agent, the following method may be employed: that is to say, the composition of the present invention is uniformly applied onto the transparent substrate such as glass, plastic film, etc. provided with transparent electrodes by a spin-coating method or a printing method, then the composition as applied onto the substrate is cured under heating at a temperature ranging from 100° to 400° C., or preferably from 150° to 250° C., for a time period of from 1 min. to 2 hours to form the polyimide resin film having a film thickness of from 200 Å to 3000 Å, and finally the thus formed polyimide resin film layer is subjected to rubbing treatment to thereby obtain the liquid crystal cell aligning agent.

The composition according to the present invention can be used as the liquid crystal cell aligning agent having a large pretilt angle of the liquid crystals and excellent uniform applicability.

Further, the pretilt angle of the liquid crystals can be arbitrarily adjusted by changing the quantity of use of the diimide compound precursor represented by the formula (II) or (III).

With a view to enabling those persons skilled in the art to practise the present invention, the following preferred examples are presented. It should, however, be noted that these examples are merely illustrative of the present invention and not so restrictive, and that any changes and modifications may be made to the ingredients used, reaction conditions, and so forth within the ambit of the present invention as recited in the appended claims.

EXAMPLE 1

4.1 g (0.01 mol) of 2,2-bis[4-(4-aminophenoxy)-phenyl]propane was added to 200 ml of N-methylpyrrolidone, which were well agitated into a uniform solution. Thereafter, 6.48 g (0.02 mol) of n-hexadecylsuccinic acid anhydride was added to the solution, and agitation was continued for four hours at 20° C.

The resulted solution was charged into a large quantity of water, and white sedimentation as deposited was filtered and dried under a reduced pressure for eight hours at 30° C. to thereby obtain the precursor of diimide compound containing an alkyl chain having 16 carbon atoms.

Subsequently, 4.1 g (0.01 mol) of 2,2-bis[4-(4-aminophenoxy)phenyl]propane and 1.92 g (0.0098 mol) of cyclobutanetetracarboxylic acid dianhydride were reacted in 54.2 g of N-methylpyrrolidone for four hours at 23° C., thereby preparing the solution of polyimide resin precursor. Reduced viscosity $\eta_{SP}/C$ of the thus obtained polyimide resin precursor was 0.71 dl/g (in 0.5% by weight of N-methylpyrrolidone solution at 30° C.).

To 30 g of this polyimide resin precursor solution, there were added 70 g of N-methylpyrrolidone and 0.3 g of the above-mentioned diimide compound (10% by weight with respect to the polyimide resin precursor component), and the batch was sufficiently agitated into a uniform solution.

This diluted solution was applied by a spin-coating method onto a pair of glass substrates provided with transparent electrodes. Uniform coating could be done without any crawling, etc. having been observed in the transparent electrodes, the glass substrate, and the boundary between these two parts. Subsequently, the coated solution was heat-treated at 170° C. for 60 min. to form a layer of the polyimide resin film.

After this polyimide resin coating was rubbed with cloth, the pair of glass substrates were assembled with a spacer of 50 μm having been interposed between them and with these substrates having been arranged so that the polyimide resin coating may be faced each other with their rubbing directions being in a parallel relationship. Thereafter, liquid crystals ("ZLI-2293"—a product of Merck & Co.) were injected into a space formed by the substrates to thereby obtained a homogeneously aligned liquid crystal cell.

When this liquid crystal cell was rotated in a cross nickol, there could be observed clear contrast of brightness and darkness, hence the liquid crystals were verified to have been excellently aligned in the direction of the rubbing.

Also, this liquid crystal cell was found to have its pretilt angle of 19° when it was measured by a magnetic capacitance null method.

EXAMPLE 2

2.48 g (0.01 mol) of a compound of the following formula:

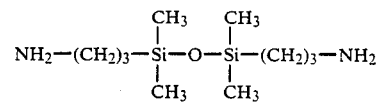

was added to 80.6 g of N-methylpyrrolidone, and agitated to obtain a uniform solution. After this, 6.48 g (0.02 mol) of n-hexadecyl succinic acid anhydride was added to this uniform solution, and agitation was continued for four hours at 20° C. to thereby prepare the solution of diimide compound precursor.

Subsequently, in the same manner as in Example 1 above, the polyimide resin precursor was prepared. Then, to 30 g of the solution of this polyimide resin precursor, there were added 2.4 g of the above-mentioned diimide compound precursor and 67.6 g of N-methylpyrrolidone, and the batch was sufficiently agitated to obtain a uniform solution.

This diluted solution was applied by a spin-coating method onto a pair of glass substrates provided with transparent electrodes. Uniform coating could be done without any crawling, etc. having been observed in the transparent electrodes, the glass substrate, and the boundary between these two parts in the test specimen.

Thereafter, the liquid crystal cell was manufactured in the same manner as in Example 1 above, and the pretilt angle of the liquid crystals was measured by the magnetic capacitance null method, which was indicated to be 12°.

EXAMPLE 3

4.82 g (0.02 mol) of n-hexadecylamine was added to 150 ml of N-methyl-2-pyrrolidone (hereinafter abbreviated as "NMP"), which were well agitated into a uniform solution. Thereafter, 1.96 g (0.01 mol) of 1,2,3,4-cyclobutane tetracarboxylic acid dianhydride was added to the solution, and agitation was continued for four hours at 20° C.

The resulted solution was charged into a large quantity of water, and white sedimentation as deposited was filtered and dried under a reduced pressure for eight hours at 30° C. to thereby obtain the diimide compound precursor containing therein alkyl chains having 16 carbon atoms.

Subsequently, 4.1 g (0.01 mol) of 2,2-bis[4-(4-aminophenoxy)phenyl]propane and 1.92 g (0.0098 mol) of cyclobutane tetracarboxylic acid dianhydride were reacted in 54.2 g of N-methylpyrrolidone for four hours at 23° C., thereby preparing the solution of polyimide resin precursor.

Reduced viscosity $\eta_{SP}/C$ of the thus obtained polyimide resin precursor was 0.71 dl/g (in 0.5% by weight of N-methylpyrrolidone solution at 30° C.).

To 30 g of this polyimide resin precursor solution, there were added 70 g of N-methylpyrrolidone and 0.09 g of the above-mentioned diimide compound precursor (3% by weight with respect to the polyimide resin precursor component), and the batch was sufficiently agitated into a uniform solution.

This diluted solution was applied by the spin-coating method onto a pair of glass substrates provided with transparent electrodes. Uniform coating could be done without any crawling, etc. having been observed in the transparent electrodes, the glass substrate, and the boundary between these two parts. Subsequently, the coated solution was heat-treated at 170° C. for 60 min. to form a layer of the polyimide resin film.

After this polyimide resin coating was rubbed with cloth, the pair of glass substrates were assembled with a spacer of 50 μm having been interposed between them and with these substrates having been arranged s that the polyimide resin coating may be faced each other with their rubbing directions being in a parallel relationship. Thereafter, liquid crystals ("ZLI-2293"—a product of Merck & Co.) were injected into a space defined by the substrate to thereby obtain a homogeneously aligned liquid crystal cell.

When this liquid crystal cell was rotated in a cross nickol, there could be observed clear contrast of brightness and darkness, hence the liquid crystals were verified to have been excellently aligned in the direction of the rubbing.

Also, this liquid crystal cell was found to have its pretilt angle of 15° when it was measured by the magnetic capacitance null method.

COMPARATIVE EXAMPLE 1

The liquid crystal cell was manufactured in the same manner as in Example 1 above with use of the polyimide resin precursor solution in Example 1, but without use of the diimide compound precursor. This liquid crystal cell showed to have its pretilt angle of the liquid crystals of as low as 2.7° when it was measured by the magnetic capacitance null method.

We claim:
1. A composition for a liquid crystal aligning agent characterized by that it consists essentially of:
a polyimide resin precursor having repeating units represented by the formula (I):

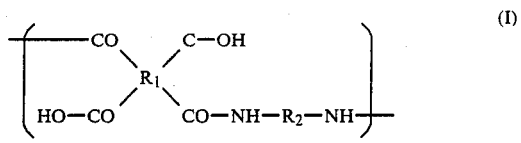

wherein $R_1$ denotes an organic group constituting a tetracarboxylic acid or its derivative; and $R_2$ represents a divalent organic group constituting a diamine; and a precursor of a diimide compound represented by the formula (II) or (III):

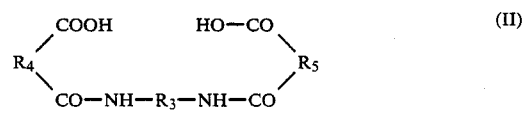

wherein $R_3$ denotes a divalent organic group constituting a diamine; each of $R_4$ and $R_5$ represents an organic group constituting a dicarboxylic acid containing an alkyl group having 6 to 20 carbon atoms, or its derivative,

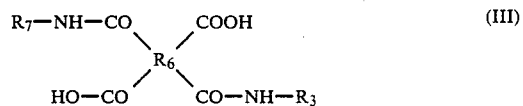

wherein $R_6$ denotes an organic group constituting a tetracarboxylic acid or its derivative; and each of $R_7$ and $R_8$ represents an organic group constituting a monoamine containing an alkyl group having 6 to 20 carbon atoms.

2. The composition according to claim 1, wherein the precursor of a diimide compound of the formula (II) or (III) is in an amount of from 0.1 to 100% by weight, relative to the polyimide resin precursor of the formula (I).

3. The composition according to claim 1, wherein the polyimide resin precursor of the formula (I) is the one obtained by reacting one or more compounds selected from tetracarboxylic acids of the formula (IV):

wherein $R_1$ denotes a tetravalent organic group constituting a tetracarboxylic acid, the four carbonyl groups attached to $R_1$ being bonded directly to individual carbon atoms, respectively, and their derivatives, with a diamine of the formula (V):

wherein $R_2$ denotes a divalent organic group constituting a diamine.

4. The composition according to claim 1, wherein the precursor of a diimide compound of the formula (II) is the one obtained by reacting one or more compounds selected from diamines of the formula (VI):

$$H_2N-R_3-NH_2 \quad (VI)$$

wherein $R_3$ denotes a divalent organic group constituting a diamine, with dicarboxylic acids of the formulas (VII) and (VIII):

$$R_4\begin{matrix}\diagup COOH\\ \diagdown COOH\end{matrix} \quad (VII)$$

$$R_5\begin{matrix}\diagup COOH\\ \diagdown COOH\end{matrix} \quad (VIII)$$

wherein each of $R_4$ and $R_5$ denotes an organic group constituting a dicarboxylic acid containing an alkyl group having from 6 to 20 carbon atoms, or its derivative, or with their derivatives.

5. The composition according to claim 1, wherein the precursor of a diimide compound of the formula (III) is the one obtained by reacting one or more compounds selected from tetracarboxylic acids of the formula (IX):

$$\begin{matrix}HOOC\diagdown\quad\diagup COOH\\ R_6\\ HOOC\diagup\quad\diagdown COOH\end{matrix} \quad (IX)$$

wherein $R_6$ denotes a tetravalent organic group constituting a tetracarboxylic acid, the four carbonyl groups attached to $R_6$ being bonded directly to individual carbon atoms, respectively, and their derivatives, with monoamines of the formulas (X) and (XI):

$$R_7-NH_2 \quad (X)$$

$$R_8-NH_2 \quad (XI)$$

wherein each of $R_7$ and $R_8$ denotes an organic group constituting a monoamine containing an alkyl group having from 6 to 20 carbon atoms.

* * * * *